United States Patent Office 3,362,843
Patented Jan. 9, 1968

3,362,843
GLASS AEROSOL BOTTLES AND METHOD
FOR MAKING SAME
Robert M. Smith and Lowell J. Wells, Toledo, Ohio, assignors to Owens-Illinois, Inc., a corporation of Ohio
No Drawing. Filed Sept. 15, 1966, Ser. No. 579,528
16 Claims. (Cl. 117—72)

This application is a continuation-in-part of application Ser. No. 176,821, filed Mar. 1, 1962, which in turn is a continuation-in-part of application Ser. No. 16,926, filed Mar. 23, 1960, which in turn is a continuation-in-part of application Ser. No. 804,103, filed April 6, 1959, all now abandoned.

This invention broadly relates to a method for treating siliceous surfaces and to the improved surfaces formed by such a method. More particularly, this invention relates to the application of a strongly adhering protective coating onto a glass surface which renders the glass surface resistant to thermal and physical shock.

While the invention in its broadest scope is concerned with siliceous surfaces, it will be discussed primarily with respect to glass surfaces and specifically with respect to glass containers which may be used as aerosol spray bottles, i.e., bottles containing a fluid under pressure which forcibly ejects the contents of the bottle whenever a valve in the orifice is opened to the atmosphere.

Almost all aerosol containers presently available on the market are made of metal. The reason for this is obvious since these containers are expected to hold a fluid under considerable pressure for long periods of time. To date, the use of glass containers for this purpose has been impracticable since the accidental dropping of a glass aerosol container having a fluid under pressure could create a dangerous explosion with glass particles being thrown a considerable distance with considerable force. Because of this danger the use of glass containers for aerosol sprays has been extremely limited. Attempts have been made to securely adhere a plastic coating about the outer surface of the container, but such attempts have failed in that the plastic cannot be satisfactorily affixed to the glass surface, either chemically or mechanically. When such coated bottles under pressure are dropped and broken, the coating does not remain in adhering contact with the glass surface but separates therefrom and the bottle neck and valve assembly or each are usually projected in a dangerous manner. A large hole remains in the plastic film through which glass fragments and the contents of the bottle are also projected.

One attempt to mechanically affix the resin coating to the glass bottle has been to provide a circumferential groove in the neck of the bottle into which the resin coating is anchored. However, the presence of the groove is a major drawback since it considerably weakens the neck of the bottle and makes it that much more prone to breakage upon being dropped.

A satisfactory coating to be applied to a glass surface in order to render the surface substantially shatter-proof must have several fundamental characteristics. The first is that it must adhere tenaciously to the glass under varying atmospheric conditions from relatively dry to highly humid, without being peelable from the surface. Another is that the coating must remain unitary, i.e., it must not crack or chip when subjected to physical or thermal shock such as having a heavy object dropped thereon or being rapidly subjected from a high temperature to a low temperature or vice versa.

A further characteristic is that the coating must be resilient in order to absorb physical shocks to a certain extent. Thus a bottle with such a coating about its outer surface can be safely dropped under normal conditions and no breakage of the bottle or the coating will occur. Under extremely abnormal conditions, a heavy physical shock, although capable of breaking or cracking the glass bottle, should not cause any physical separation of any portion of the coating. Thus an aerosol bottle, although it may crack or be broken, would not explode dangerously and scatter glass particles since the coating would hold the broken bottle together.

Accordingly, it is an object of the present invention to provide a siliceous surface having an improved protective coating thereon, which coating will adhere tenaciously thereto even when subjected to highly humid conditions, and which will enable the surface to successfully withstand thermal and physical shocks.

Another object of this invention is to provide a glass surface having a particular primer thereon which primer adheres to the glass surface and permits a resinous coating to be securely bonded to the glass surface, and maintains the bond even when the surface is subjected to highly humid atmospheres.

A further object of this invention is to provide a glass container coated with a resinous composition and primer therefor which container, when thermally shocked or shocked by impact to the point of fracture, is retained within the protective coating and thus prevents any damage due to implosive or explosive action.

Still another object of this invention is to provide a method for forming glass laminates wherein the individual layers of glass are securely bonded to each other and which bond will remain even under extremely humid conditions.

Another object is to provide a method for treating glass surfaces to improve the adherence thereto of commercially known epoxy resin based inks, which inks will adhere tenaciously to the surfaces and will not be removed therefrom when the surfaces are subjected to humid or moist conditions.

In attaining the objects of this invention one feature resides in coating a siliceous surface with an amino alkylalkoxy silane, applying a coating comprising an epoxy resin thereto and then applying the outer plastic coating which forms a film on the siliceous surface and is securely bonded thereto.

It is another feature of this invention to coat the surface of a glass article with a mixture of an amino alkylethoxy silane and an epoxy resin-methyl methacrylate polymer primer by any conventional method, such as dipping, spraying, and the like, and then applying the plastic coating to the primed surface and permitting the latter to fuse and form a continuous protective film on the glass article.

Still another feature resides in coating a glass surface with a layer of a mixture comprising an amino alkylethoxy silane and an epoxy resin-methyl methacrylate polymer primer, applying a layer of a vinyl resin dispersion to the first layer, applying another layer of the aforesaid mixture to a second glass surface and then adhering the second primed glass surface to the vinyl resin layer to form a securely bonded laminate.

A further feature resides in a shatterproof glass aerosol bottle having a tenaciously adhering resilient vinyl resin coating on substantially its entire outer surface, wherein the coating is bonded to the outer surface of the glass bottle by a primer which is a mixture of (a) an aminoalkylalkoxy silane and (b) a mixture of an unesterified epoxy resin and methyl methacrylate polymer. The silane may be present in the primer mixture in an amount of at least about 0.05% based on the solids content of the epoxy resin-methacrylate mixture.

Other objects, features and advantages of the present invention will become obvious from the following description thereof.

A suitable film forming plastic material which will provide a colorless, transparent, protective coating on a glass surface may be obtained from a vinyl resin dispersion or suspension.

Such dispersions or suspensions are readily available commercially and are better known as vinyl plastisols and vinyl organosols. The former are mixtures of vinyl resins, plasticizers and stabilizers which can be molded, cast or converted to continuous films by the application of heat. If the mixtures contain volatile organic thinners or liquids, they are referred to as organosols. The most common vinyl resins are vinyl chloride and vinyl chloride-vinyl acetate. Among the vinyl resins presently available are those sold under the trade designations Geon 121, Marvinol VR–51, Bakelite QYNV, Exon 654, and Opalon 410. The resin dispersions may also contain pigments and fillers as well as additional plasticizers and stabilizers without detracting from the effectiveness of the primers of this invention.

Since a vinyl resin coating has no natural affinity for glass (when applied, it may easily be peeled therefrom) a number of primer compositions, including epoxy resin compositions, have been utilized to increase the bonding properties of the vinyl resin coating to the glass. A principal disadvantage of epoxy resin-containing primers for vinyl resin coatings is that a glass surface, primed therewith, when subjected to moist or humid conditions, has its primer bond considerably, if not completely weakened. Thus, glass aerosol containers primed with a primer-containing epoxy resin and then coated with a vinyl resin, after being subjected to humid conditions, have very little protection afforded them by the vinyl resin coating in the event of their being subjected to a physical impact. Since the bond is considerably weakened, any breakage of the glass may rupture the protective vinyl envelope and glass fragments may be scattered over a wide area.

It has been found, now, that if the glass surface is first coated with a solution containing an amino alkylalkoxy silane, such as an aminoalkyl triethoxy silane, aminoalkyldiethoxy silane, etc., the adherence of an epoxy resin containing primer and a vinyl resin dispersion to the glass surface, even under extremely adverse humidity conditions is vastly improved.

While the particular primers of this invention may be broadly defined as aminoalkylalkoxy silanes, it has been found that excellent results are obtained when the silane has at least one alkyl group and at least one ethoxy group directly linked to the silicon atom. The amino radical is linked to at least one of the alkyl groups, which groups are preferably of the type known in chemical terminology as lower alkyl, and usually include from 1 to 12 carbon atoms. Specific examples of silanes coming within the above definition are gamma-amino propyltriethoxy silane and delta-aminobutyl-methyldiethoxy silane and the invention will be further described with respect to the use of and the results obtained from these aforementioned silanes.

Applicants have found that if the outer surface of a glass bottle is first coated with an amino alkylethoxy silane, such as gamma-aminopropyltriethoxy silane, and the treated surface is further primed with a primer composition containing an epoxy resin and a methyl methacrylate polymer and then a vinyl resin dispersion is applied thereto and fused thereon, the vinyl resin coating will adhere tenaciously to the glass surface even under abnormally high humidity conditions.

While the preferred methods of applying the gamma-aminopropyltriethoxy silane to the bottles are by either dipping or spraying, other methods, of course, will be apparent to those skilled in the art.

While the gamma-aminopropyltriethoxy silane, in solution, may be first applied to the bottles, followed by the additional primer composition containing an epoxy resin and methyl methacrylate polymer and then the outer vinyl resin dispersion coating is applied, it is preferred to combine the silane with the epoxy resin-methyl methacrylate polymer to form a single primer coating thus omitting a coating step in the process of forming the finished aerosol bottle.

EXAMPLE I

An illustrative method for forming a strongly adhering vinyl resin coating on the outer surface of a glass bottle is as follows, although the method may be varied with the particular siliceous surface to be coated. The bottle is first suspended in a primer bath, maintained at room temperature and containing gamma-aminopropyltriethoxy silane and a mixture of an unesterified epoxy resin and methyl methacrylate polymer in organic solvents wherein the ratio of the polymer to the resin is preferably between about 25:75 and 97:3 by weight. The silane is present in an amount at least .05% by weight based on the solids content of the epoxy-methacrylate mixture. The primed bottle is slowly withdrawn from the bath so that a thin coating of primer, approximately one mil thick, is formed on the outer surface of the bottle. The temperature of the bottle is then increased to 250° F. such as by placing it within a pre-heat oven. While a temperature of 250° F. is preferred, the temperature can vary between approximately 200 to 400° F. and it is this temperature which will control the thickness of the vinyl resin coating on the bottle.

The heated primed bottle is then suspended in a bath containing a vinyl resin dispersion, which bath is kept at a temperature of about 85° F. to give the dispersion a viscosity of about 8,000 centipoises. This temperature and viscosity is ideal when the temperature of the glass bottle is about 250° F. However, under certain conditions, such as when the ware is at other temperatures, the viscosity may range between 5,000 and 30,000 centipoises.

The temperature of the glass as it is dipped into the vinyl resin bath together with the length of time it is immersed in the bath control the amount of vinyl resin that can gel onto the surface of the glass. As soon as the temperature of the glass drops to a point where gelation will no longer occur, the thickness of the vinyl resin coating is defined. Thus the thickness of the coating may be predetermined and all of the variable factors so adjusted. If desired, of course, the dispersion may also contain an organic or inorganic pigment or a mixture of both to impart a desired color to the finished product.

The vinyl resin dispersion coated glass bottle is next heated to a temperature of 400° F. until the resin is fused to form a coating, preferably about 50 thousandths of an inch thick. A fusing oven may be used for this purpose and it can be operated at a temperature within the range of from about 350 to 425° F., depending upon the length of time the bottle is to be held therein. The bottle is then cooled so as to permit handling by the operator.

The following table shows comparative peel strength results using various ratios of epoxy resins to methyl methacrylate polymers in a primer composition containing a 2% by weight, based on the resin solids, of gamma-aminopropyltriethoxy silane and 4% by weight of the curing agent, diethylene triamine, based on the epoxy, Epon 1007. The organic solvent for the batches was a mixture of 67%, by volume, methyl ethyl ketone and 33%, by volume, methyl isobutyl ketone, except for batch No. 8 where ethylene glycol mono methyl ether was substituted for part of the methyl isobutyl ketone.

TABLE A

| Batch No. | Ratio of Epoxy to Methacrylate | Peel Strength (average) | |
|---|---|---|---|
| | | Stored 1 day 50% RH* at 73° F. | Stored 3 days in 75% RH* at 100° F. |
| 1 | 100/0 | | |
| 2 | 90/10 | 22 | 10 |
| 3 | 80/20 | 38 | 21 |
| 4 | 70/30 | 39 | 39 |
| 5 | 60/40 | 41 | 42 |
| 6 | 50/50 | 41 | 35 |
| 7 | 40/60 | 38 | 39 |
| 8 | 30/70 | 40 | 45 |
| 9 | 20/80 | 36 | 40 |
| 10 | 10/90 | 40 | 37 |
| 11 | 5/95 | 40 | 39 |
| 12 | 3/97 | 34 | 37 |
| 13 | 1/99 | 35 | Low-spotty. |
| 14 | 0/100 | | |

*RH—Relative Humidity.

Methyl methacrylate polymers are commercially available under the trade designations Lucite 41 and Acryloid A–10 and A101. "Acryloid" is the trademark of the Rohm & Haas Company. Acryloid A101, for example, is a solution of methyl methacrylate in 60% methyl ethyl ketone. Commercially available epoxy resins include Epon 562, 828, 864, 1001, 1007 and 1009, Epi-Rez 520, 540 and 550. Epon is the trademark of the Shell Chemical Corp.

One type of these commercially available resins has the general structure as follows:

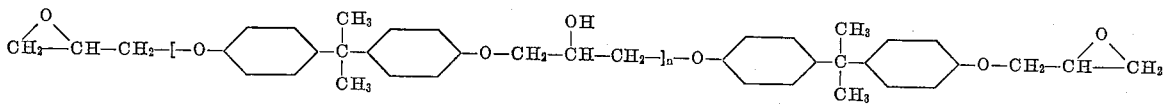

Thus Epon 1001 and 1007 are of this type, as well as the other Epon resins mentioned, and differ mainly in their degree of polymerization or molecular weight. For instance, Epon 1001 as a melting point, Durrans Mercury Method, of 65–75° C., while Epon 1007 has a melting point of 125–135° C. Epon 1001 is a solid, unesterified epoxy resin while Epon 828, for example, is a liquid epoxy resin.

Among the known curing agents for epoxy resins are included the functional amines, such as diethylene triamine, tri-ethylene tetramine, tetraethylene pentamine, diethylaminopropylamine, dibutylaminopropylamine, meta phenylenediamine and the like. Dicyandiamide has been used as an effective curing agent for the epoxy resin with the added advantage of improving the storage stability or shelf life of the primer composition of the invention. The curing agent is present in an amount of about 2 to 6% by weight of the mixture of epoxy resin and methyl methacrylate, and preferably in an amount of 4%, but amounts outside of these ranges will give satisfactory results.

Examples of epoxy resin primers for use in the process of the invention are as follows:

*Example A*

| | Percent |
|---|---|
| Epoxy resin (Epon 1007) | 16.5 |
| Methyl methacrylate resin (Acryloid A–101) | 7.0 |
| Diethylene triamine | 0.66 |
| Methyl isobutyl ketone | 25.40 |
| Methyl ethyl ketone | 50.44 |
| | 100.00 |

*Example B*

| | Percent |
|---|---|
| Epoxy resin (Epon 1007) | 12.2 |
| Methyl methacrylate resin (Acryloid A–101) | 12.2 |
| Diethylene triamine | 0.5 |
| Methyl ethyl ketone | 52.6 |
| Methyl isobutyl ketone | 22.5 |
| | 100.00 |

*Example C*

| | Percent |
|---|---|
| Epoxy resin (Epon 1001) | 18.0 |
| Methyl methacrylate resin (Acryloid A–10) | 6.0 |
| Diethylene triamine | 0.7 |
| Methyl ethyl ketone | 36.5 |
| Methyl isobutyl ketone | 24.8 |
| Cellosolve acetate | 14.0 |
| | 100.00 |

*Example D*

| | Percent |
|---|---|
| Epoxy resin (Epon 1007) | 13.4 |
| Methyl methacrylate polymer | 13.4 |
| Diethylene triamine | 0.55 |
| Methyl isobutyl ketone | 27.15 |
| Methyl ethyl ketone | 45.5 |
| | 100.00 |

*Example E*

| | Percent |
|---|---|
| Epoxy resin (Epon 1007) | 13.7 |
| Methyl methacrylate polymer | 13.7 |
| Diethylene triamine | 0.56 |
| Methyl isobutyl ketone | 27.04 |
| Methyl ethyl ketone | 45.0 |
| | 100.00 |

*Example F*

| | Percent |
|---|---|
| Epoxy resin (Epon 1001) | 10.00 |
| Methyl methacrylate (Acryloid A–101) | 25.00 |
| Dicyandiamide | 0.40 |
| Gamma-aminopropyltriethoxy silane | 0.40 |
| Methyl ethyl ketone | 38.00 |
| Methyl Cellosolve | 13.10 |
| Dimethyl formamide | 13.10 |
| | 100.00 |

In Example F Methyl Cellosolve is the trade designation of Union Carbide Corporation for its ethylene glycol monomethyl ether, while the dimethyl formamide is included as the solvent for the dicyandiamide. Other solvents for the dicyandiamide will be readily apparent to the art and may also be used.

It has been found that glass bottles which have been first pretreated with a composition containing from about 0.1 to 5% or more by weight of an aminoalkylalkoxy silane, such as gamma-aminopropyltriethoxy silane, based on the solids content of the epoxy resin-methyl methacrylate primer, and then coated with a vinyl plastisol film have the bond between the film and the glass surface greatly improved and the bond is not impaired when the glass is subsequently subjected to highly humid conditions. While about 5% of the silane may be used satisfactorily, use of this amount or even more, merely adds to the cost of the finished product without materially improving the quality of the bond proportionally.

EXAMPLE II

A number of sets of ten glass bottles each were coated with a mixture of gamma-aminopropyltriethoxy silane and the primer of Example A, heated at 400° F. for 2 minutes and then dip-coated with the following vinyl plastisol:

| | Parts |
|---|---|
| Polyvinyl chloride | 100 |
| Di-2 ethyl hexyl phthalate | 80 |
| Tin mercaptide | 1 |

The vinyl resin coating was then heated for 7 minutes at a temperature of 400° F. to form a fused coating. Half of the bottles were kept in a standard atmosphere of 50% relative humidity at 73° F. and the other half were stored for three days in an atmosphere of 75% relative humidity at 100° F. All bottles were then tested for peel strength. This was done by placing a vertical strip of cellophane pressure-sensitive tape on each bottle prior to being coated with the primer and plastisol. Prior to testing, a one inch horizontal belt was cut about the periphery of the bottle and traversing the cellophane tape. By also cutting along one vertical edge of the tape a tab portion of the vinyl resin coating is formed having a width equal to the width of the tape. The bottle is then placed in a Tinius-Olsen Universal Testing Machine and the pulling force in pounds per inch applied to the tab before the vinyl resin tab tears or the vinyl resin coating is stripped from the bottle along the belt portion is recorded.

The following table shows the results for the various silane primers of the invention and compares the results with the same epoxy resin primer of Example A without the gamma-aminopropyltriethoxy silane. The particular silane is present in amounts based on the solids content of the epoxy primer.

TABLE I

| | Peel Strength (average) | |
|---|---|---|
| | Stored 1 day in 50% RH at 73° F. | Stored 3 days in 75% RH at 100° F. |
| Percent Silane: | Lb./in. | Lb./in. |
| 5.0 | 45.0 | 40.0 |
| 2.0 | 49.7 | 44.0 |
| 1.0 | 43.5 | 44.5 |
| 0.5 | 42.7 | 43.0 |
| 0.1 | 47.6 | 41.3 |
| 0.05 | 39.1 | 23.3 |
| 0.01 | 42.7 | 8.2 |
| 0.0 | 43.5 | 1.8 |

The bottles coated with the primer containing .01% silane and without the silane had the vinyl film stripped completely off along the belt portion.

EXAMPLE III

The 0.1% primer composition of Example II was stored for one month and during this time the solution turned milky and a flocculent precipitate settled out. Upon thoroughly mixing the primer composition and coating the bottle in the manner described in Example I, the peel strength of the vinyl resin coating was tested, and the results are shown in the following table.

TABLE II

| | Peel Strength (average) | |
|---|---|---|
| | Stored 1 day in 50% RH at 73° F. | Stored 3 days in 75% RH at 100° F. |
| Percent Silane: 0.1 | Lb./in. 36.1 | Lb./in. 36.4 |

EXAMPLE IV

The epoxy resin-methyl methacrylate primer of Example A had admixed thereto varying amounts of gamma-aminopropyltriethoxy silane, based on the solids content thereof. Two sets of ten glass bottles each were coated with the mixture of silane and epoxy primer and one set of ten bottles were primed only with the primer of Example A. All bottles were heated at 400° F. for two minutes, and then dip-coated with the following plastisol:

| | Parts |
|---|---|
| Polyvinyl chloride (Geon 121) | 100 |
| Diisooctyl phthalate | 80 |
| Tin mercaptide | 1 |

The vinyl resin coating was heated for a period of ten minutes at a temperature of 400° F. to form a fused coating. After storage, the bottles were tested for peel strength, with the following results:

TABLE III

| | Peel Strength (average) | |
|---|---|---|
| | Stored 1 day in 50% RH at 73° F. | Stored 3 days in 75% RH at 100° F. |
| Percent Silane: | Lb./in. | Lb./in. |
| 1.0 | 48.8 | 44.4 |
| 0.5 | 49.5 | 43.3 |
| 0.0 | 47.2 | 0.0 |

With no gamma-aminopropyltriethoxy silane in the primer, the vinyl resin coating just peeled from the bottles after they had been subjected to the high humidity, since its adherency to the glass surface was completely destroyed.

EXAMPLE V

The 1.0% primer composition of Example IV was stored for 30 days at which time it turned milky and formed a precipitate. After stirring thoroughly, it was applied in the manner described in Example IV with the following results:

TABLE IV

| | Peel Strength (average) | |
|---|---|---|
| | Stored 1 day in 50% RH at 73° F. | Stored 3 days in 75% RH at 100° F. |
| Percent Silane: 1.0 | Lb./in. 48.3 | Lb./in. 48.7 |

This again indicates that the primer mixture can be stored and its effect, when used, is not diminished because of such storage.

EXAMPLE V(a)

The primer of Example F was applied to a number of glass bottles by dipping. The primed bottles were then heated at 400° F. for two minutes and dip-coated with the vinyl plastisol of Example II. The resin coating was heated to 400° F. for 10 minutes and the coating was fused. The bottles were tested for adhesion with the following results.

TABLE V(a)

| Peel Strength (average) | |
|---|---|
| Stored 1 day in 50% RH at 73° F. | Stored 3 days in 75% RH at 100° F. |
| Lb./in. 30.0 | Lb./in. 34.0 |

The primer of Example F remained entirely clear and free of precipitate during a storage period of eight weeks and its viscosity changed from 10.0 centipoises, when prepared to 14.0 centipoises at the end of eight weeks.

EXAMPLE VI

To the epoxy resin-methyl methacrylate primer of Example A was added 2%, again based on the solids content, of delta-aminobutylmethyldiethoxy silane. The primer composition was then applied to the bottles by the dip-method, preheated at 400° F. for two minutes, and dip-coated with the following plastisol:

| | Parts |
|---|---|
| Polyvinyl chloride | 100 |
| Di-2 ethyl hexyl phthalate | 70 |
| Tin mercaptide | 2 |

The resin coating was heated to 400° F. for ten minutes and the coating fused. The bottles were tested for adhesion with the following results:

TABLE V

| | Peel Strength (average) | |
|---|---|---|
| | Stored 1 day in 50% RH at 73° F. | Stored 3 days in 75% RH at 100° F. |
| Percent Silane: | Lb./in. | Lb./in. |
| 2.0 | 39.0 | 42.0 |
| 0.0 | 25.8 | 0.0 |

EXAMPLE VII

The scratching and marring of glass surfaces during manufacture is usually prevented by coating the surface with polyoxyethylene monostearate sold under the trade designation MYRJ 52-S by the Atlas Powder Company. This lubricious coating permits contact between the articles without scratching or damaging the virgin surface areas of the ware and at the same time captures the type of surface area which gives the greatest possible strength to the ware. It is only when the original blown or pressed surface of the ware can be retained without any scratches that you can have the strongest ware. Ten bottles which had been dipped into a 0.06% MYRJ 52-S solution and air-dried were coated with the 1.0% primer and plastisol of Example II, by the same process. The bottles were then tested for adherence, and the results were as follows:

TABLE VI

| | Peel Strength (average) | |
|---|---|---|
| | Stored 1 day in 50% RH at 73° F. | Stored 12 days in 75% RH at 100° F. |
| Percent Saline: | Lb./in. | Lb./in. |
| 1.0 | 51.4 | 50.4 |

From the above table, it appears that the adhesion strength is not decreased by the presence of the polyoxyethylene monostearate, even when the bottles are subjected to high humidity for 12 days, which is a very severe test. In fact, the polyoxyethylene monostearate may be admixed with the epoxy primer containing the silane, and the composition applied to the glass surface prior to the application of the vinyl plastisol.

EXAMPLE VIII

Twenty glass bottles had the 1.0% primer and vinyl resin plastisol of Example II applied thereto and twenty additional glass bottles were treated in the same manner except that the gamma-aminopropyltriethoxy silane was omitted from the epoxy resin primer mixture. Both sets of bottles were subjected to a drop-test after being filled with 80 grams of Freon 12–114 (20–80%) (25 p.s.i.g. mixture) and stored for three days at 100° F. and 75% relative humidity.

Each of the bottles were then dropped six feet onto a ½ inch steel plate backed up with four inches of concrete. All of the bottles which were not primed with the silane had lost all adhesion between the vinyl resin coating and the glass surface. About fifty percent of these bottles permitted sizeable glass fragments to escape and the group as a whole was unsatisfactory for aerosol purposes.

The bottles which were primed in accordance with the invention maintained excellent adhesion of the vinyl resin coating to the glass surface. Ninety-five percent of the bottles retained all of the glass and only a small amount of sand-like particles escaped from the remaining five perecent.

The glass bottles treated in accordance with the invention are superior to those not primed with the amino alkylethoxy silane as aerosol containers.

EXAMPLE IX

Three bottles were treated with epoxy primer containing 1.0% silane and coated with the vinyl resin plastisol as in Example II. Three additional bottles were likewise coated except that the gamma-aminopropyltriethoxy silane was omitted. All bottles were then filled with 90 grams of Freon 12–114 (20–80%) (25 p.s.i.g. mixture) and stored at 100° F. at 75% RH for a 72 hour period. The bottles were then dropped 20 feet onto concrete.

In each of the three primed bottles of the invention, the glass broke and the gas was slowly vented from the envelope without rupture. Each of the three unprimed bottles immediately broke and the envelope was ruptured with particles of glass up to two inches being ejected from one container and up to one and a half inches from the remaining two containers.

EXAMPLE X

Forty bottles were treated with the 1.0% silane-containing primer and coated with the vinyl resin as in Example II. Forty additional bottles were similarly prepared except that the gamma-aminopropyltriethoxy silane primer was omitted. Both groups of bottles were filled with 80 grams of Freon 12–114 (20–80%) (25 p.s.i.g. mixture) stored at 100° F. at 75% RH for a 72 hour period and then dropped six feet onto concrete. Each bottle was dropped until it either showed damage or was dropped a maximum of ten times with no damage.

The following results were noted:

*Silane primed bottles*

14 bottles sustained no damage whatsoever.
19 bottles had the glass break and the envelope rupture. However, six of these needed at least five drops before breaking and only one bottle ejected a glass splinter as long as one inch. More of the glass particles were ¼ inch and less in length.
2 bottles had the glass break (one on the 10th drop and one on the first drop) but the envelope did not rupture although the gas did vent slowly from the container.
5 bottles had no glass breakage but showed leakage from the valve seal (one after the fourth drop, two after the fifth drop and one after the sixth drop).

*Unprimed bottles*

2 bottles sustained no damage.
28 bottles had the glass break and the envelope rupture. One of these required ten drops, five required four drops, four required three drops, four required two drops and fourteen broke on the first drop. All ejected glass particles as follows (several bottles had several sizes of particles).

| No. of bottles: | Size of particles (inches) |
|---|---|
| 1 | 4 |
| 3 | 3 |
| 12 | 2 |
| 5 | 1½ |
| 24 | 1 |
| 27 | ½ |
| 27 | ¼ |
| 28 | <¼ |

Ten bottles were damaged at the valve seal.

The above data discloses the importance of having glass aerosol bottles coated with a vinyl resin coating which is adhered to the glass by a mixture of an epoxy resin primer and an amino alkylethoxy silane. Unless a tenacious bond is retained after the glass has been subjected to humid conditions, the danger of the vinyl envelope bursting and a shower of glass splinters being ejected in a dangerous manner is greatly increased.

EXAMPLE XI

To ascertain the shock-resistance effectiveness of the protective coating, six bottles were primed in accordance with the method of Example II and then coated with a vinyl resin-dispersion which produced a soft, flexible, vinyl foam coating of approximately ¼ inch thickness when fused. The bottles were loaded with 80 grams of Freon of a mixture to give 25 lbs. per square inch at room temperature, and then stored for three days at 100° F. to bring the pressure to 50 lbs. per square inch. Three unprimed bottles, i.e., having the same primer, except for the gamma-aminopropyltriethoxy silane, and vinyl coating were also similarly prepared.

Two primed bottles were dropped ten times in a six foot chamber onto concrete, being careful to avoid landing on the neck. None of the bottles broke.

The same two bottles were then dropped from a height of 15 feet onto a concrete surface. Again, none of the bottles broke at this distance. All ten bottles then were dropped from a height of 40 feet onto a concrete surface. The following results were obtained.

| Bottle No. | Primed | Description |
|---|---|---|
| 1 | No | Entire bottom missing. All glass scattered. |
| 2 | No | Bottom and shoulder split. Much glass scattered. |
| 3 | Yes | No failure. |
| 4 | Yes | Do. |
| 5 | No | Coating intact, valve flew off ejecting some glass. |
| 6 | Yes | Coating and valve intact. Bottle broken but 100% retained. |
| 7 | Yes | Do. |
| 8 | Yes | No bottle failure but loss of pressure. |
| 9 | Yes | No failure. |
| 10 | Yes | Valve flew off. All glass retained. |

From the above test it is apparent that except for the exposed valve, the foam-coated bottle is practically 100% safe for all practical purposes. In tests which go beyond practicality, the thicker flexible foam affords the most protection. Adherence of the vinyl resin coating to the bottle prevented the glass from scattering in cases where the bottle broke. In one case, Bottle No. 5, when the valve was ejected, it travelled approximately 75 feet. The bottle had not been primed in accordance with the invention.

EXAMPLE XII

Five bottles were primed with an 0.1% aqueous solution of gamma-aminopropyltriethoxy silane and five bottles were primed with an 0.01% aqueous solution of the same silane. After drying in air for five minutes the bottles were coated with the epoxy primer of Example A. The bottles were again air dried for one minute, then preheated at 400° F., for two minutes, dipped in the vinyl resin plastisol for Example II and then heated at a temperature of 400° F., for ten minutes to form a fused coating on the bottles.

Each were then tested for peel strength with the following results:

TABLE VIII

| | Peel Strength (average) | |
|---|---|---|
| | Stored 1 day in 50% RH at 73° F. | Stored 3 days in 75% RH at 100° F. |
| Percent Silane: | Lb./in. | Lb./in. |
| 0.1 | 39.0 | 41.0 |
| 0.01 | 55.3 | 51.6 |

From the above, it will be noted that as little as 0.01% silane primer is effective to maintain a good bond under adverse humidity conditions when it is applied to the glass surface alone. However, for commercial purposes, it will be desirable to combine the silane primer with the epoxy resin primer in order to have one priming step.

Other uses of the invention are to be noted. It is known that epoxy resins give one of the hardest, toughest, and most adherent ink bases for use on glass. However, use of these inks on glass surfaces has been relatively limited since water, in contact with the glass surface will cause such inks to quickly lose their adhesion to glass. Applicants have found that if the glass surface were first primed with an aqueous solution of an aminoalkylethoxy silane, such as an 0.01% solution of gamma-aminopropyltriethoxy silane, and allowed to dry thereon, the loss of epoxy ink adhesion by water attack is prevented. Thus by use of the particular silanes of this invention, an unsatisfactory printed product is surprisingly turned into a satisfactory one.

A number of additional uses wherein glass surfaces may be coated with the silane and epoxy resin-alkyl methacrylate polymer described above and further coated with a vinyl dispersion such as vinyl plastisol is in connection with the tubular spindles or bobbins utilized to wind nylon filament in the synthetic fiber industry.

EXAMPLE XIII

Glass bobbins having an O.D. of 38 to 48 mm. and an overall length of 11⅞ inches, a wall thickness of from 3⅓ to 6 mm. were coated in the manner indicated in Example II using a one percent silane-containing primer, with the vinyl plastisol coating extending over both the internal and external surfaces of the bobbin. The bobbins weigh less than one pound and are adapted to retain two pounds of tightly wound filament which is wound over an eight-hour period at speeds of rotation of about 7800 r.p.m.

Bobbins prepared in accordance with the invention, wherein glass is utilized rather than steel, have both strength and safety.

A further use for the protective coating of this invention is to cover the outer surface of television picture tubes with a transparent film, which tubes are under high vacuum and which present a constant danger if struck a hard blow and shattered. Such a picture tube, coated with the composition disclosed in this invention would be fully protected against shattering and projecting glass particles except under the most extreme circumstances.

Still another use for the primer of this invention resides in the lamination of two or more glass sheets having a fused vinyl resin coating sandwiched therebetween.

Much work has been done in the art attempting to obtain cold-color organic inks suitable for application to glass surfaces by the silk screen method. While epoxy-based resin coating materials in a solvent appeared to be satisfactory for inks of this type, they had the disadvantage, when cured with all types of amine curing agents, of losing their adhesion to glass surfaces when the glass was stored in humid places or when the glass was subject to aqueous or alkaline washings.

It is known that when epoxy-resin inks are cured with polybasic acids or acid anhydrides, such as citric acid, or pyromellitic dianhydride, the acid-cured inks maintain their adhesion to glass when stored under moist conditions. U.S. Patent 2,821,486 discloses the use of citric acid as the curing medium for such inks. However, acid-cured epoxy-based inks still have many disadvantages when used commercially. The principal disadvantage is the need for a relatively long cure time at high temperature in order to obtain the best properties. Another disadvantage is that epoxy-based inks which are to be acid-cured require a certain waiting time after compounding before they are suitable to use as printing inks. Since this time amounts to from one to two days, and since the useful shelf life of such inks is limited to approximately five days, after which time the ink loses its excellent adhesion properties to glass stored under moist conditions, the commercial disadvantages of such inks are readily apparent. A more serious disadvantage of these inks is the fact that these inks are not alkali resistant, so that application thereof to glass surfaces which are to be washed in soap or detergent solutions, such as glass tumblers, is not practical.

It has been found that aqueous solutions containing as little as 0.001% of the amino silane of the invention are not only effective in promoting the permanent adhesion of the cold-color epoxy-based resin inks to glass surfaces but, more importantly, these inks are now alkali resistant, thus opening up a vast field of glass surfaces to which these inks may be commercially applied.

The amino silane of the invention may be also described as an amino-substituted alkyl alkoxy silane wherein all four valences of the Si atom have one or two amino substituted alkyls and three or two alkoxy groups, and, if desired, an alkyl group. The silane may be illustrated by the formula

wherein R is an amino-substituted alkyl, R' is a member selected from the group consisting of an amino-substituted alkyl, alkyl, and an alkoxy group and R" is an alkoxy group.

Good results have been obtained with the process of the invention when the amino group is separated from the Si atom by at least three carbon atoms, such as when the alkyl group is propyl or butyl. It is preferred to have the alkoxy group contain 1–3 carbon atoms since good results have been obtained thereby.

Solutions of about 0.01% of the aforesaid amino silane appear about optimum in effectiveness when treating glass surfaces, while solutions containing a concentration of more than 0.5% are not effective in enhancing the adhesion, presumably because the excess of silane over and above that needed to adhere the epoxy-based resin remains on the glass surface as a contaminant. However, it has been found that when the amino silane is to be incorporated into an epoxy-based resin ink, it is necessary to add from about 1–5% of the amino-silane in order to obtain excellent adhesion of the ink films on glass surfaces which are to be stored under moist conditions. The larger amount of the silane is required because a greater amount thereof is immobilized in the viscous ink and is unable to reach the glass surface. It is within the skill of persons in this field to readily ascertain, from the above disclosure, the amount of amino-silane of the invention to be added to the cold-color epoxy-based resin inks and which will be sufficient to cause the inks to adhere to the glass surfaces.

When the amino-silane of the invention is incorporated with the cold-color epoxy-based resin inks, these inks have an excellent pot-life and shelf-life, and when applied to glass surfaces such as glass bottles or otherwise, the ink is quickly dried and cured, enabling the printed bottles to be promptly handled for packaging and shipping.

Among the solvents that can be used in place of the solvent of the aforesaid examples are included methyl-ethyl ketone, methyl isobutyl ketone, diacetone alcohol, n-butyl acetate, ethylene glycol monoethyl ether, ethylene glycol monomethyl ether, ethylene glycol monobutyl ether, diethylene glycol monoethyl ether, diethylene glycol monomethyl ether, diethylene glycol monobutyl ether, ethylene glycol monoethyl ether acetate, toluene, xylene, trichloropropane, chloroform, isophorone, a mixture of toluene-isopropyl alcohol, a mixture of toluene-sec butyl alcohol, a mixture of toluene with 4-methyl-2-pentanol, and the like. Other suitable solvents will be readily apparent from the above disclosure.

The foregoing examples show that the glass aerosol bottles have the tenaciously adhering resilient vinyl resin coating on the entire outer surface thereof. In accordance with another aspect of the invention, the resilient vinyl resin tenaciously adheres to substantially the entire surface of the glass aerosol bottles. Under actual commercial operations it is often desirable that a relatively small portion of the coating does not adhere to the container. For example, glass aerosol containers often include a reduced neck portion and a head surmounting such neck. To this head is attached a dispensing-type closure cap or fitment, such being hermetically sealed in place by spinning or otherwise contracting an attaching skirt beneath the head or over some other protuberance, into firm contact with the adjacent surface of the container. The container may be filled either prior to or following such closing.

Because such spinning or other procedure resorted to in contracting the attaching skirt into effective tight holding relationship with the glass subjects the latter to considerable pressure or stress and in some instances cracks or fractures the glass so that the container will leak, in normal use, it is necessary to provide reliable means for detecting or indicating the presence of any such "leakers," or "potential leakers," prior to placing the packages in the hands of the consuming public. Reference is made to U.S. Patents 3,014,607 and 3,131,077, both patents being assigned to the assignee of the present invention.

Thus, in accordance with this aspect of the invention, an aerosol container is provided with a resilient vinyl resin coating which tenaciously adheres to substantially the entire outer surface but which does not adhere to the container in a relatively small area. In the event of a fracture or crack in the container of sufficient severity to permit leakage of the pressurized contents, the coating will quickly expand or bulge in a selected localized and relatively small area or zone and afford visible evidence of the damaged container, thereby enabling ready detection and elimination of defective containers. The selected area where the coating does not adhere to the glass bottle may comprise one or more small zones.

As used in the present application the term "epoxy resin" is not to be considered limiting in any manner and is to be considered inclusive of all known epoxy resins since no reason can be advanced at the present time why any epoxy resin should not be operable for the purpose of the invention.

It is known that epoxy resins are characterized by having reactive epoxide groups

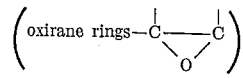

in the resin structure, and are commonly supplied in both liquid and solid form. The major types of epoxy resins are the diglycidyl ether of bisphenol A (and its homologs), glycidyl ethers of glycerol, glycidyl ethers of bisphenol F bis(4 hydroxy phenol)methane, glycidyl ethers of tetrakis(hydroxyphenyl)ethane, and epoxylated novolacs. These epoxy resins are further described in the publication "Epoxy Resins" by Henry Lee and Kris Neville, McGraw-Hill Book Company, Inc., 1957, and the formulations set forth therein for the above structures are incorporated herewith by reference.

An epoxy resin may also be defined as any molecule containing more than one epoxy group and which is capable of curing or reacting to a hard, tough durable solid. Further disclosures and discussions with respect to epoxy resins may be found in the publication, "Epoxy Product Data," of Union Carbide Plastics Co., containing the article, "New Developments in Epoxy Resins," and in the Modern Plastics Encyclopedia, which issues annually in the fall. A good discussion appears in the 1962 issue, volume 39, No. 1A, pages 186–197.

The epoxidized novolac resins have the hydroxyl groups of the novolac resins replaced by glycidyl ether groups. An example of these resins is that made and sold by the Dow Chemical Company under the trademark D.E.N. 438. This resin has a functionality of 3.3 epoxy groups per molecule, compared to a functionality of 1.95 and below for most conventional epoxy resins.

D.E.N. 438 novolac has the following formula in which the average value of $n$ is 1.3.

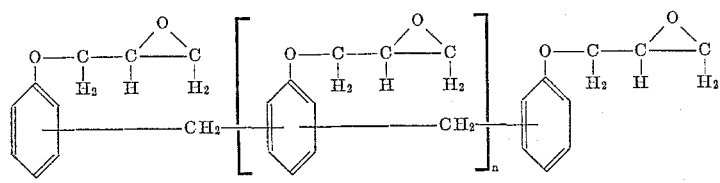

Another commercially available epoxy resin is sold under the trademark "Oxiron" by Food Machinery and Chemical Corporation, and is broadly defined as the product of epoxidation of olefins containing two or more epoxy groups per molecule and other functional groups in addition such as hydroxyl ester and unsaturated hydrocarbon groups. Oxiron 2000 has the following formulation:

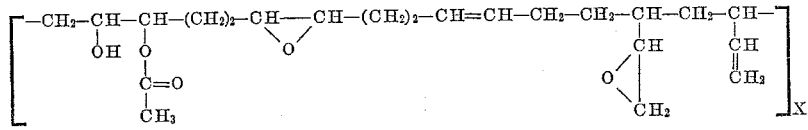

The above arrangement contrasts with conventional epoxy structure in which there are only two terminal epoxy groups in the resin molecule. The Oxiron 2000 molecule may afford five or more epoxy reaction sites.

A number of satisfactory cold-color epoxy based resin inks have been made with a variety of commercially available epoxy resins, including Oxiron 2000 and D.E.N. 438, and the inks which contained the amino-silanes of the invention, firmly and tenaciously adhered to the surface of the glassware to which they were applied, even after immersion in water and in alkali solutions.

When the term "epoxy-based resin" is used in this application it is intended to include all formulations wherein the epoxy resin is the principal ingredient and it should be understood that other resins in varying amounts may be incorporated in the formulation.

Besides the gamma-aminopropyltriethoxy silane and the delta-amino-butylmethyldiethoxy silane exemplified above, good results have been obtained with delta-aminobutyltriethoxy silane. The silanes of the present invention are suitable for use with all commercially known and available epoxy inks including those disclosed in U.S. Patent 2,821,486, which ink disclosure is also incorporated herein by reference.

What is claimed is:

1. A shatterproof glass aerosol bottle having a tenaciously adhering resilient vinyl resin coating on substantially the entire outer surface thereof, said coating bonded to said outer surface by a primer consisting essentially of a mixture of (a) an aminoalkylalkoxy silane and (b) a mixture of an unesterified epoxy resin and methyl methacrylate polymer, said silane being present in said primer mixture in an amount of at least 0.05% based on the solids content of said epoxy-resin-methyl methacrylate mixture, said coating adhering to said surface even after being subjected to highly humid conditions.

2. A shatterproof glass aerosol bottle as defined in claim 1 wherein said aminoalkylalkoxy silane contains from 1 to 3 carbon atoms in the alkoxy group.

3. A shatterproof glass aerosol bottle having a tenaciously adhering resilient vinyl resin coating on its entire outer surface, said coating formed from a member selected from the group consisting of a vinyl plastisol and a vinyl organosol, said coating bonded to said outer surface by a primer consisting essentially of a mixture of (a) a silane selected from the group consisting of gamma-aminopropyltriethoxy silane and deltaaminobutylmethyldiethoxy silane and (b) a mixture of an unesterified epoxy resin and methyl methacrylate polymer, said silane being present in said primer mixture in an amount of at least 0.05% based on the solids content of said epoxy resin-methyl methacrylate mixture, said coating adhering to said surface even after being subjected to highly humid conditions.

4. The shatterproof glass aerosol bottle as defined in claim 3 wherein the ratio of methacrylate polymer to epoxy resin is about 25:75 to 97:3.

5. The shatterproof glass aerosol bottle as defined in claim 3 wherein said vinyl resin coating is a vinyl chloride and said silane is gamma-aminopropyltriethoxysilane.

6. The shatterproof glass aerosol bottle as defined in claim 3 wherein said vinyl resin coating is a vinyl chloride vinyl acetate copolymer and said silane is delta-aminobutylmethyldiethoxy silane.

7. A shatterproof glass aerosol bottle having a tenaciously adhering resilient vinyl resin coating on its entire outer surface, said coating formed from a member selected from the group consisting of a vinyl plastisol and a vinyl organosol, said coating bonded to said outer surface by two superimposed primers, the first of said primers being a member selected from the group consisting of gamma-aminopropyltriethoxy silane and delta-aminobutylmethyldiethoxy silane, and the second of said primers being an unesterified epoxy resin-alkyl methacrylate polymer dissolved in organic solvents, said coating adhering to said surface even after being subjected to highly humid conditions.

8. A shatterproof glass aerosol bottle as defined in claim 3 wherein said glass surface has a lubricious coating of a polyoxyethylene monostearate underlying said primer and vinyl resin coating.

9. The method of making a glass container shatterproof comprising the steps of applying a first primer coating consisting essentially of an aminoalkylalkoxy silane to the surface of said container, applying a second primer coating consisting essentially of a mixture of an epoxy resin-methyl methacrylate polymer in an organic solvent to said first primed surface, heating said primed surface to an elevated temperature, applying a vinyl resin dispersion selected from the group consisting of vinyl plastisols and vinyl organosols to said primed surface of the container, and heating said dispersion to form a fused vinyl resin coating, said coating tenaciously adhering to said surface even after being subjected to highly humid conditions.

10. The method as defined in claim 9 wherein the alkoxy group of said silane contains from 1 to 3 carbon atoms.

11. The method of making a glass bottle shatterproof comprising applying a first primer coating of a silane selected from the group consisting of gamma-aminoalkyltriethoxy silane and delta-aminobutylmethyl diethoxy silane, to the entire outer surface of said glass bottle, applying a second primer coating consisting essentially of a mixture of a methyl methacrylate polymer and an unesterified epoxy resin dissolved in an organic solvent to said first primed surface, the ratio of the methacrylate polymer to epoxy resin being between 25:75 and 97:3, heating said primed surface to an elevated temperature of between 200 and 400° F., applying a vinyl resin dispersion selected from the group consisting of vinyl plastisols and vinyl organosols to the primed surface and heating the dispersion to form a fused vinyl resin coating, said coating tenaciously adhering to said surface even after being subjected to highly humid conditions.

12. The method of making a glass bottle shatterproof comprising applying a primer to the entire surface thereof, said primer consisting essentially of a mixture of (a) an aminoalkylethoxy silane and (b) an epoxy-resin-methyl methacrylate polymer dissolved in an organic solvent, wherein said silane is present in an amount of at least 0.05% based on the solids content of said epoxy-resin-methyl methacrylate mixture, heating said primed surface to an elevated temperature of between 200 and 400° F., applying a vinyl resin dispersion selected from the group consisting of vinyl plastisols and vinyl organosols, to the primed surface and thereafter heating the dispersion to form a fused vinyl resin coating, said coating tenaciously adhering to said surface even after being subjected to highly humid conditions.

13. The method of bonding a vinyl resin coating to the entire outer surface of a glass bottle, which coating will adhere thereto even after being subjected to highly humid conditions consisting essentially of applying a primer to said surface, said primer consisting essentially of a mixture of (a) a silane selected from the group consisting of gamma-aminopropyltriethoxy silane and delta-aminobutylmethyldiethoxy silane and (b) a mixture of a methylmethacrylate polymer and an unesterified epoxy resin dissolved in an organic solvent, the ratio of the methacrylate polymer to epoxy resin being between approximately 25:75 and 97:3, heating said primed surface to an elevated temperature of between 200 and 400° F., said silane being present in an amount of at least 0.05% based on the solids content of said epoxy resin-methyl methacrylate mixture, applying a vinyl resin dispersion selected from the group consisting of vinyl plastisols and vinyl organosols to the primed surface and heating the dispersion to form a fused vinyl resin coating.

14. The method as defined in claim 13 wherein said epoxy resin and said methacrylate polymer are present in approximately equal parts.

15. The method as defined in claim 13 wherein said outer surface of said glass bottle is first coated with a solution of polyoxyethylene monostearate and dried, prior to the application of the primer and the vinyl resin dispersion thereto.

16. The method of bonding a resilient vinyl resin coating to a glass surface to render said surface shatterproof, said coating adhering thereto even after being subjected to highly humid conditions, which comprises applying a primer selected from the group consisting of gamma-aminopropyltriethoxy silane and delta-aminobutylmethyldiethoxy silane to said surface, applying a second primer consisting essentially of a mixture of an epoxy resin-methyl-methacrylate polymer in an organic solvent to said primed surface, heating said primed surface to an elevated temperature of from 200 to 400° F., applying a vinyl resin dispersion selected from the group consisting of vinyl plastisols and vinyl organosols, to the primed surface and thereafter heating the dispersion to form a fused vinyl resin coating.

References Cited

UNITED STATES PATENTS

| | | | |
|---|---|---|---|
| 2,159,630 | 5/1939 | Haux et al. | 156—106 |
| 2,563,288 | 8/1951 | Steinman | 156—329 X |
| 2,649,396 | 8/1953 | Witt et al. | 156—314 |
| 2,698,314 | 12/1954 | Rust | 260—46.5 X |
| 2,763,573 | 9/1956 | Biefeld | 117—72 |
| 2,827,440 | 3/1958 | Arrandale et al. | 117—161 X |
| 2,832,747 | 4/1958 | Jackson | 260—46.5 |
| 2,832,754 | 4/1958 | Jex et al. | 260—448.2 X |
| 2,842,459 | 7/1958 | Gollub et al. | 117—132 X |
| 2,877,207 | 3/1959 | Cox et al. | 260—46.5 |
| 2,917,197 | 12/1959 | Glover et al. | 222—183 X |
| 2,926,101 | 2/1960 | Schaefer | 117—12 X |
| 2,931,739 | 4/1960 | Marzocchi et al. | 117—126 |
| 2,946,701 | 7/1960 | Plueddman | 117—72 |
| 2,974,077 | 3/1961 | Smith et al. | 156—106 |
| 2,979,420 | 4/1961 | Harper | 117—72 |
| 3,131,077 | 4/1964 | Barnby et al. | 117—5.5 |

WILLIAM D. MARTIN, *Primary Examiner.*

R. HUSACK, *Assistant Examiner.*